United States Patent [19]

Benantar et al.

[11] Patent Number: 5,765,153
[45] Date of Patent: Jun. 9, 1998

[54] INFORMATION HANDLING SYSTEM, METHOD, AND ARTICLE OF MANUFACTURE INCLUDING OBJECT SYSTEM AUTHORIZATION AND REGISTRATION

[75] Inventors: Messaoud Benantar, Poughkeepsie, N.Y.; George Robert Blakley, III; Anthony Joseph Nadalin, both of Austin, Tex.

[73] Assignee: International Business Machines Corporation, Armonk, N.Y.

[21] Appl. No.: 582,271

[22] Filed: Jan. 3, 1996

[51] Int. Cl.⁶ ........................................ G06F 7/00
[52] U.S. Cl. .................. 707/9; 707/103; 707/205; 370/358; 370/359; 370/351
[58] Field of Search ........................ 395/601–615, 395/616–617, 621; 707/1–10, 200–206, 100–104; 370/254–463

[56] References Cited

U.S. PATENT DOCUMENTS

| | | | |
|---|---|---|---|
| 4,525,780 | 6/1985 | Bratt et al. | 364/200 |
| 4,814,971 | 3/1989 | Thatte | 364/200 |
| 4,853,842 | 8/1989 | Thatte et al. | 364/200 |
| 4,989,132 | 1/1991 | Mellender et al. | 364/200 |
| 5,008,786 | 4/1991 | Thatte | 364/200 |
| 5,016,162 | 5/1991 | Epstein et al. | 364/200 |
| 5,043,871 | 8/1991 | Nishigaki et al. | 364/200 |
| 5,047,925 | 9/1991 | Kun et al. | 364/200 |
| 5,075,845 | 12/1991 | Lai et al. | 395/425 |
| 5,093,914 | 3/1992 | Coplien et al. | 395/700 |
| 5,095,480 | 3/1992 | Fenner | 370/94.1 |
| 5,111,413 | 5/1992 | Lazansky et al. | 364/578 |
| 5,136,712 | 8/1992 | Perazzoli, Jr. et al. | 395/700 |
| 5,163,148 | 11/1992 | Walls | 395/600 |
| 5,185,736 | 2/1993 | Tyrrell et al. | 370/55 |
| 5,185,885 | 2/1993 | Dysart et al. | 395/600 |
| 5,212,787 | 5/1993 | Baker et al. | 395/600 |
| 5,226,172 | 7/1993 | Seymour et al. | 395/800 |
| 5,261,052 | 11/1993 | Shimamoto et al. | 395/200 |
| 5,263,157 | 11/1993 | Janis | 395/600 |
| 5,263,158 | 11/1993 | Janis | 395/600 |
| 5,263,165 | 11/1993 | Janis | 395/725 |
| 5,265,221 | 11/1993 | Miller | 395/725 |
| 5,276,872 | 1/1994 | Lomet et al. | 395/600 |
| 5,280,610 | 1/1994 | Travis, Jr. et al. | 395/600 |
| 5,283,830 | 2/1994 | Hinsley et al. | 380/25 |
| 5,287,453 | 2/1994 | Roberts | 395/200 |
| 5,291,283 | 3/1994 | Kondo et al. | 348/390 |

(List continued on next page.)

*Primary Examiner*—Thomas G. Black
*Assistant Examiner*—David Yiuk Jung
*Attorney, Agent, or Firm*—Jenkins & Gilchrist; Mark S. Walker

[57] ABSTRACT

A system, method and article of manufacture, for improving object security in distributed object systems, in an information handling system employing object oriented technology, includes one or more processors, a storage system, a system bus, a display sub-system controlling a display device, a cursor control device, an I/O controller for controlling I/O devices, all connected by system bus an operating system such as the OS/2* operating system program (OS/2 is a registered trademark of International Business Machines Corporation), one or more application programs for executing user tasks and an object oriented control program, such as, DSOM Objects program, which is a commercially available product of International Business Machines Corporation, the object oriented control program including a system authorization policy (SAP) object, a system authorization oracle (SAO) object, and a system registration object (SRO). The SAP object encapsulates management of a resource authorization policy. It may also be used to retrieve security attributes of objects in order to perform access checking. An object's security attribute includes the access control list (ACL) governing access to the object. The SAP object is also used to retrieve and manipulate user capabilities in an environment that is capability based for access authorization. A user capability enlists the object that the user has access to, along with the corresponding access types or permissions. A capability is the transpose of an access control list (ACL) in the global access matrix modeling user access to protected objects.

16 Claims, 5 Drawing Sheets

U.S. PATENT DOCUMENTS

| | | | |
|---|---|---|---|
| 5,295,256 | 3/1994 | Bapat | 395/500 |
| 5,297,279 | 3/1994 | Bannon et al. | 395/600 |
| 5,297,283 | 3/1994 | Kelly, Jr. et al. | 395/650 |
| 5,301,286 | 4/1994 | Rajani | 395/400 |
| 5,301,316 | 4/1994 | Hamilton et al. | 395/600 |
| 5,303,375 | 4/1994 | Collins et al. | 395/650 |
| 5,321,841 | 6/1994 | East et al. | 395/725 |
| 5,325,524 | 6/1994 | Black et al. | 395/600 |
| 5,335,323 | 8/1994 | Kolnick | 395/164 |
| 5,341,478 | 8/1994 | Travis, Jr. et al. | 395/200 |
| 5,343,554 | 8/1994 | Koza et al. | 395/13 |
| 5,363,313 | 11/1994 | Lee | 364/491 |
| 5,369,702 | 11/1994 | Shanton | 380/4 |
| 5,369,778 | 11/1994 | San Soucie et al. | 395/800 |
| 5,379,432 | 1/1995 | Orton et al. | 395/700 |
| 5,404,506 | 4/1995 | Fujisawa et al. | 395/600 |
| 5,404,508 | 4/1995 | Konrad et al. | 395/600 |
| 5,404,529 | 4/1995 | Chernikoff et al. | 395/700 |
| 5,408,649 | 4/1995 | Beshears et al. | 395/575 |
| 5,412,774 | 5/1995 | Agrawal et al. | 395/157 |
| 5,414,840 | 5/1995 | Rengarajan et al. | 395/600 |
| 5,421,012 | 5/1995 | Khoyi et al. | 395/650 |
| 5,421,015 | 5/1995 | Khoyi et al. | 395/650 |
| 5,437,027 | 7/1995 | Bannon et al. | 395/600 |
| 5,485,455 | 1/1996 | Dobbins et al. | 370/60 |
| 5,491,694 | 2/1996 | Oliver et al. | 370/85.4 |
| 5,521,910 | 5/1996 | Matthews | 370/54 |
| 5,598,562 | 1/1997 | Cutler et al. | 395/674 |

INFORMATION HANDLING SYSTEM, METHOD, AND ARTICLE OF MANUFACTURE INCLUDING OBJECT SYSTEM AUTHORIZATION AND REGISTRATION

TECHNICAL FIELD OF THE INVENTION

The present invention relates to information handling systems, methods and articles of manufacture, and more particularly to information handling systems, methods and articles of manufacture including system authorization and registration objects for enhancing security in an object oriented system.

BACKGROUND OF THE INVENTION

There is a need to improve security in object oriented systems. Many modern security systems are based on the reference monitor concept for subject authentication and resource access control. A reference monitor is the system's component that mediates each access of a subject to a resource in accordance with an underlying security policy. The policy which is generally implemented in the form of attributes associated with a registry of subjects and a registry of resources, along with a set of rules expressing the relationships between the entities of the two registries. The reference monitor acts as a single point of control for the security information and allows for its isolation from application programs with the goal of maintaining the integrity and the prevention of the policy from outside tampering.

Enforcing the reference monitor concept in procedural systems is well known. However, implementing the reference monitor concept in object oriented systems has not been achieved by any prior art known to the inventors.

In implementing the reference monitor concept in object oriented systems, a coherent method for application programs and security administers must be implemented to invoke appropriate mechanisms to request different security services in a style which maintains the reference monitor concept. Requested security services could be for managing a resource access policy (resources being object instances), inquiring as to resource access decisions, or for the subject registry.

PRIOR ART

In the prior art there are many techniques for improving object oriented programming systems (OOPS).

The following are examples of the prior art.

U.S. Pat. No. 4,525,780 teaches a data processing system having a memory organized into objects, where the system uses a protection technique to prevent unauthorized access to objects by users which are identified by a subject number identifying the user, a process for executing a user's procedure and the type of system operation to be performed by the user's procedure. An access control list is maintained to control access to objects based on subject identifier.

U.S. Pat. No. 5,136,712 teaches an object based operating system for a multitasking computer system including means for making an object private to a process. Access to a private object is controlled by an access control list.

U.S. Pat. No. 5,265,221 teaches an access control mechanism for granting, revoking, and denying authorization to objects using a system of verbs, parameters, attributes and functions.

U.S. Pat. No. 5,297,283 and U.S. Pat. No. 5,321,841 appear to teach the same system as U.S. Pat. No. 5,136,712 discussed above.

U.S. Pat. No. 5,093,914 generally teaches a method used by a digital computer in controlling execution of an object oriented program to effect a defined action, for example, stopping the program when a specified virtual function is invoked on a specified object during execution of the program.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patents generally deal with methods for protecting access to objects in object oriented programs, the patents do not teach nor suggest the implementation of a reference monitor in an object oriented system as is taught and claimed herein with reference with the present invention.

There is a need to automatically add object services features, for example, persistence, recoverability, concurrency and security to a binary class. A related copending patent application Ser. No. 08/537,648 (AT995-092) teaches and claims automatically inserting object services into binary classes in an object oriented system. The teaching of U.S. patent application Ser. No. 08/537,648 are incorporated by reference herein. Sometimes the source code of a class is not available for modification. Even when the source code is available, a considerable reprogramming effort is required to add the object services features.

SUMMARY OF THE INVENTION

It is an object of the present invention to improve object security in distributed object systems by implementing a reference monitor in an object oriented system.

Accordingly, a system, method and article of manufacture, for improving object security in distributed object systems, in an information handling system employing object oriented technology, includes, includes one or more processors, a storage system, a system bus, a display sub-system controlling a display device, a cursor control device, an I/O controller for controlling I/O devices, all connected by system bus an operating system such as the OS/2* operating system program (OS/2 is a registered trademark of International Business Machines Corporation), one or more application programs for executing user tasks and an object oriented control program, such as, DSOM Objects program, which is a commercially available product of International Business Machines Corporation, the object oriented control program including a system authorization policy (SAP) object, a system authorization oracle (SAO) object, and a system registration object (SRO). The SAP object encapsulates management of a resource authorization policy. It may also be used to retrieve security attributes of objects in order to perform access checking. An object's security attribute includes the access control list (ACL) governing access to the object.

The SAP object is also used to retrieve and manipulate user capabilities in an environment that is capability based for access authorization. A user capability enlists the object that the user has access to, along with the corresponding access types or permissions. A capability is the transpose of an access control list (ACL) in the global access matrix modeling user access to protected objects.

It is an advantage of the present invention that object security in distributed object systems is improved by implementing a reference monitor in an object oriented system.

DETAILED DESCRIPTION OF A PREFERRED EMBODIMENT OF THE INVENTION

Figure 1:
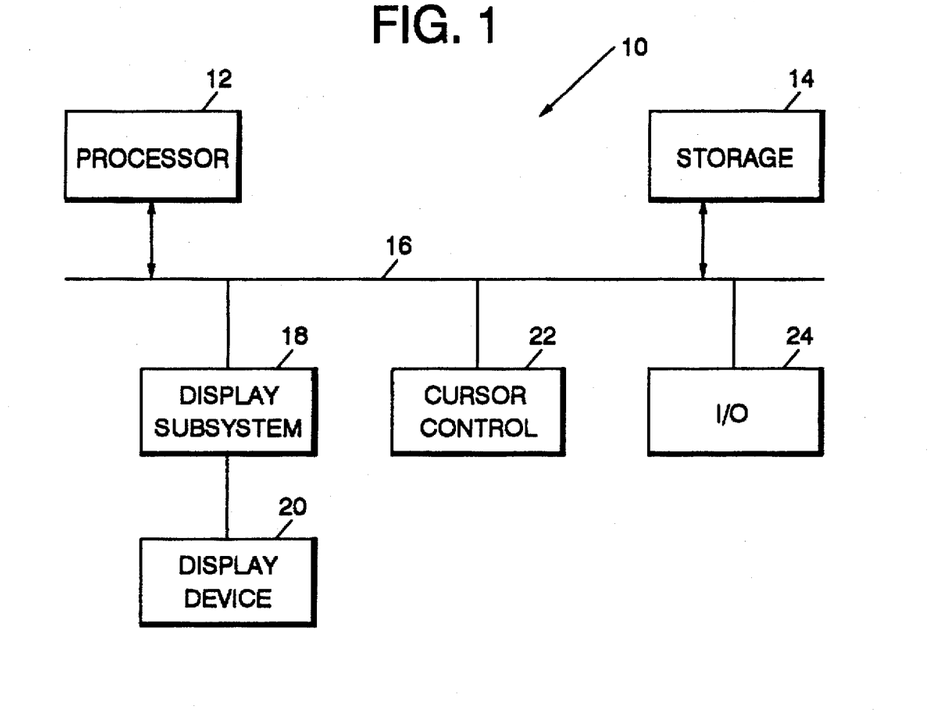
FIG. 1 is a block diagram of a system implementing the present invention.
Figure 2:
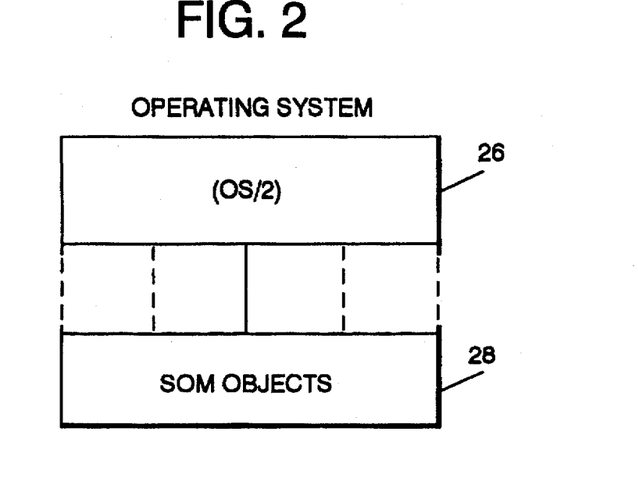
FIG. 2 is a block diagram showing the operating system platform and system object model program supporting the present invention.

Referring now to FIGS. 1 and 2, on information handling system 10 and an operating system environment for the present invention will be described.

Information handling system 10 may be a graphics work station or the like with one or more processors 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multi-tasking operating system such as OS/2* (OS/2 is a registered trademark of International Business Machines Corporation). Among many tasks which the OS/2 operating system controls in operating information handling system 10, is execution of an object oriented program, such as, DSOM Objects program, which is a commercially available product of International Business Machines Corporation.

The method of the present invention may be incorporated in the DSOMObjects program.

In accordance with the present invention, access control to objects of a binary class are provided by the Secure object service. The Secure object service according to the present invention will be described.

The way the user specifies security is to specify the following constraints when searching for a class object:
 name: secure value: A boolean indicating whether the object is protected by access control checking.
 name: ACL
 value: If secure==TRUE, an access control list.

When granularity is per method, enforcement can be done either per method invocation or when a reference is first obtained (the capability approach). The capability approach can be implemented by building a security proxy object in the server for each combination of object and ACL (list of allowed methods) that has only the subset of methods that are allowed. The ORB (or at least the server object) would have to be modified to do this.

Three objects are added to the object security services (OSS) to request different security services such that the reference monitor concept is maintained. These objects are the system authorization policy object (SAP), the system authorization oracle (SAO), and the system registration object (SRO). The term "oracle" as used in this application is used to mean "overseer." The term in no way refers to Oracle Corporation or any of its products or services.

The SAP object encapsulates management of a resource authorization policy. It also may be used to retrieve security attributes of objects in order to perform access checking. An object security attribute consists primarily of the access control list (ACL) governing access to the object.

Further, the SAP object is also used to retrieve and manipulate user capabilities in an environment that is capability based for access authorization. A user capability enlists the objects that the user has access to, along with the corresponding access types or permissions. A capability is the transpose of an access control list in the global access matrix modeling user access to protected objects. Table I below illustrates an abstract access control matrix governing access to object1 and object2 by user1 and user2.

TABLE I

|       | object1              | object2      |
|-------|----------------------|--------------|
| user1 | read, write, execute | execute      |
| user2 | execute              | read, create |

A column of the access matrix corresponds to an ACL protecting an object whereas a row corresponds to some user's capability. Most access control systems are either capability or ACL based. In capability based systems, security attributes needed for access control are associated with users, and in ACL based systems, those attributes are associated with the protected objects.

The interfaces of the SAP object, however, allow for the entire access matrix abstraction to be managed and used in an environment that uses either the ACL mechanism, the capability mechanism alone, or a combination of both ACL and capability mechanisms, in which case the SAP interfaces will effect an ACL registry and a user's registry, respectively.

There is one SAP per address space which is generated during initialization of the kernel of the object oriented program. A reference to the SAP object becomes visible in the security component of the object oriented program.

The policy methods that the SAP object receives include the creation, modification, and the destruction of object ACLs and user capabilities.

Figure 3:
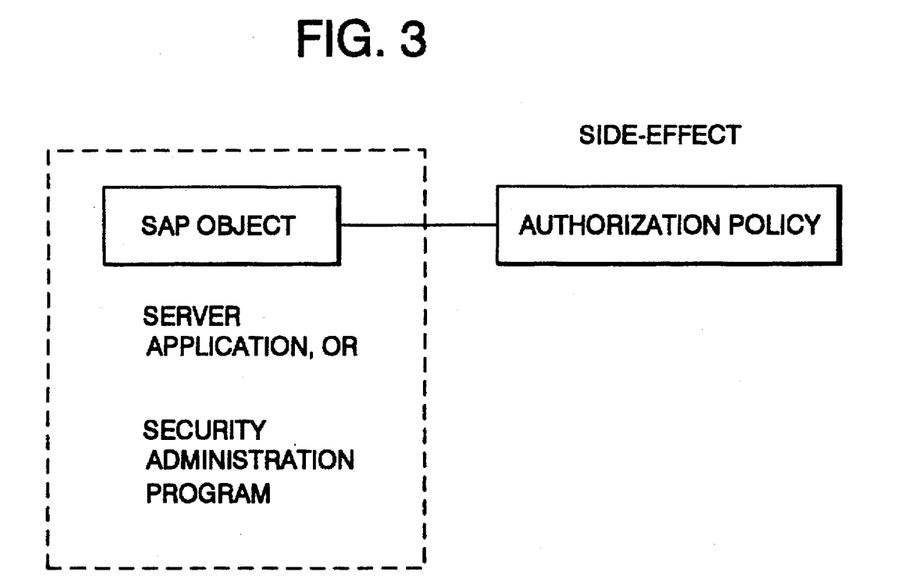
FIG. 3 is a block diagram of a System Authorization Policy object according to the present invention.

Referring now to FIG. 3, further description of the implementation of the SAP object will be provided. The SAP object may act as ae wrapper around a distributed computing environment (DCE) ACL manager. Thus, the execution of the SAP methods causes a side effect on some underlying storage for a DCE ACL manager. The wrapping of the SAP object around the DCE ACL manager is an important factor in flexibility of integrating authorization with prior art systems. The SAP object is also used to retrieve capabilities stored in a user's registry which may be set up as a B-tree structure.

The System Authorization Oracle Object (SAO) encapsulates the process of the decision making at access checking time. The rationale for isolating this function from the system authorization policy objects (SAP) is to make it independent from underlying policy registry implementation mechanisms and enforce system integrity. As such, tampering with the access decision will not propagate to the policy registry. Tampering with the policy has a wider scope and lasts longer than effecting a run time decision for access by a particular object to a particular object.

Figure 4:
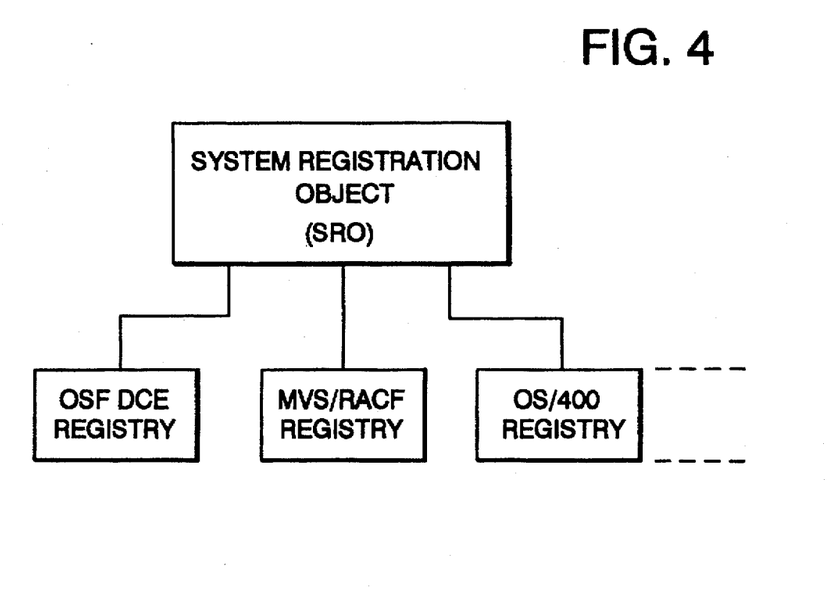
FIG. 4 is a block diagram of an interface between a System Registration Object and prior art registries according to the present invention.

The system registration object (SRO) shown in FIG. 4 is used to encapsulate the functionality of managing the subject registry in a preferred embodiment of the present invention. This includes the management of subject capability for environments that are capability based for authorization. In such environments, a user's capability enlists the objects to which the user is allowed access, along with the type of access that corresponds to the methods the user can execute. This registry will be mainly used for account creation, subject security attribute modification, and account deletion. In order to allow for integration flexibility, the SRO object can be used to provide for an object wrapper around an existing procedural registry such as the OSF DCEs. Furthermore, this can be a wrapper around a legacy registry such as the IBM MVS/RACF as indicated in FIG. 4.

Figure 5:
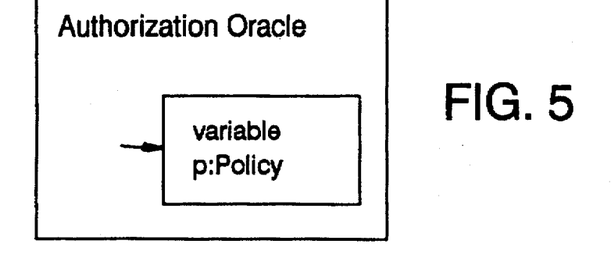
FIG. 5 illustrates the relationship between a system authorization article and the policy it implements according to the present invention.

The object security services (OSS) mechanism employs system authorization oracle (SAO) objects to decide whether users' messages are allowed or forbidden by the system security policy. A system authorization oracle makes authorization decisions but does not permit management of the policy which its decisions enforce. The interface through which other routines can request an authorization decision from a system authorization oracle is the "accessAllowed" method. The visibility view shown in FIG. 5 illustrates the relationship between a system authorization article and the policy it implements.

Figure 6:
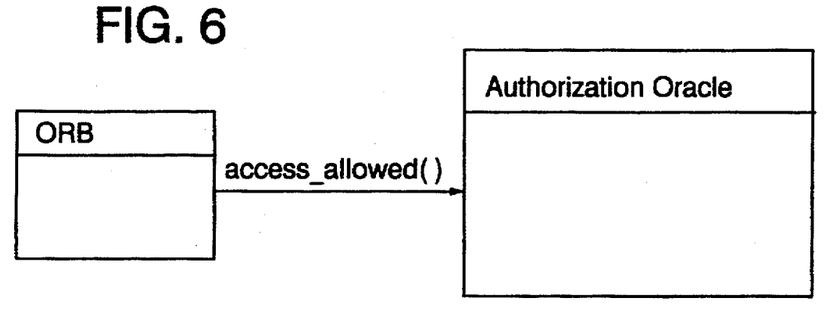
FIG. 6 is an object interaction diagram which illustrates how the OSS mechanism uses the system authorization oracle to make access control decisions according to the present invention.

The object interaction diagram of FIG. 6 illustrates how the OSS mechanism uses the system authorization oracle to make access control decisions.

Figure 7:
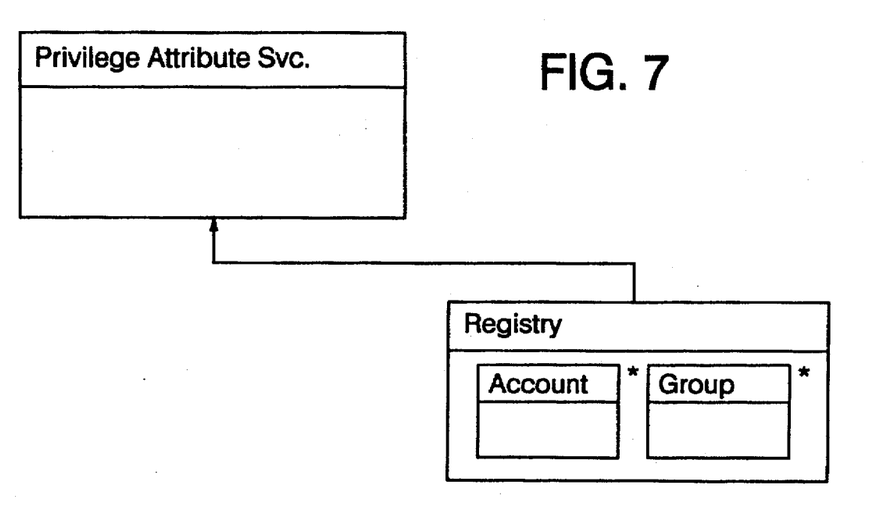
FIG. 7 illustrates the registry object model and the relationship between the registry and the privilege attribute service class according to the present invention.

OSS also provides a registry object whose interfaces allow management of account and group objects. The registry object is a subclass of the OSS privilege attribute service run time class. The registry object provides interfaces for management of privilege attribute data and other account data while the privilege attribute service class provides query interfaces. The registry object model and the relationship between the registry and the privilege attribute service class is shown in FIG. 7.

Figure 8:
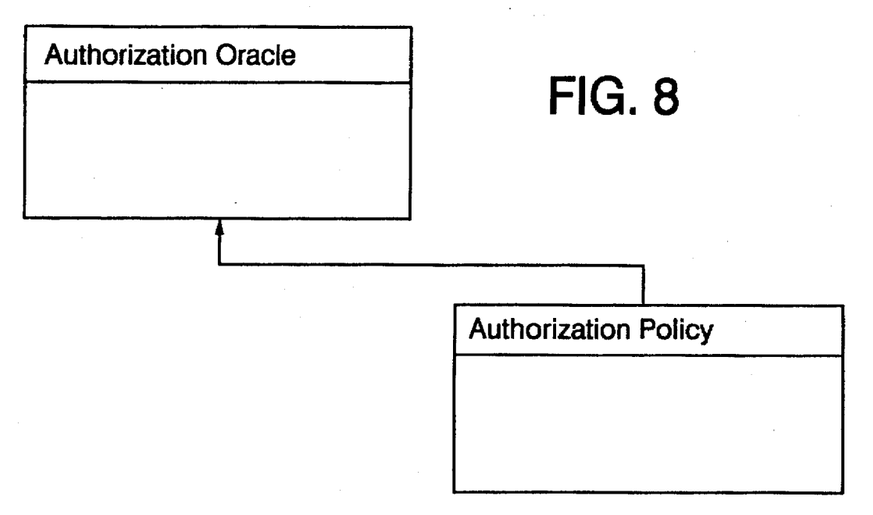
FIG. 8 is an object model diagram which illustrates the relationship between system authorization oracles and system authorization policies according to the present invention.

Referring now to FIG. 8, an object model diagram is shown which illustrates the relationship between system authorization oracles and system authorization policies (SAP). A system authorization policy is a system authorization oracle with a policy management interface.

Figure 9:
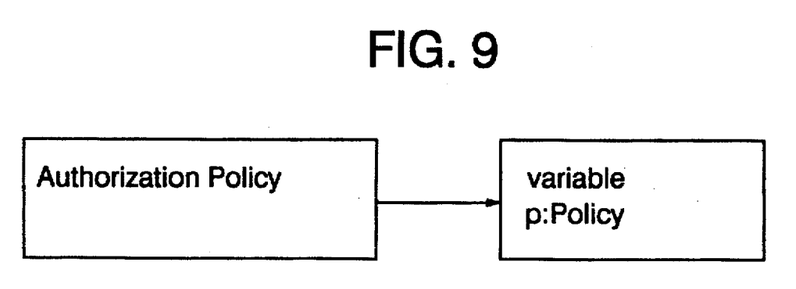
FIG. 9 illustrates a visibility diagram which characterizes the system authorization policy object according to the present invention.

FIG. 9 is a visibility diagram which characterizes the system authorization policy object. SAP objects inherit authorization checking interface from SAO. They also allow management of authorization policy.

Figure 10:
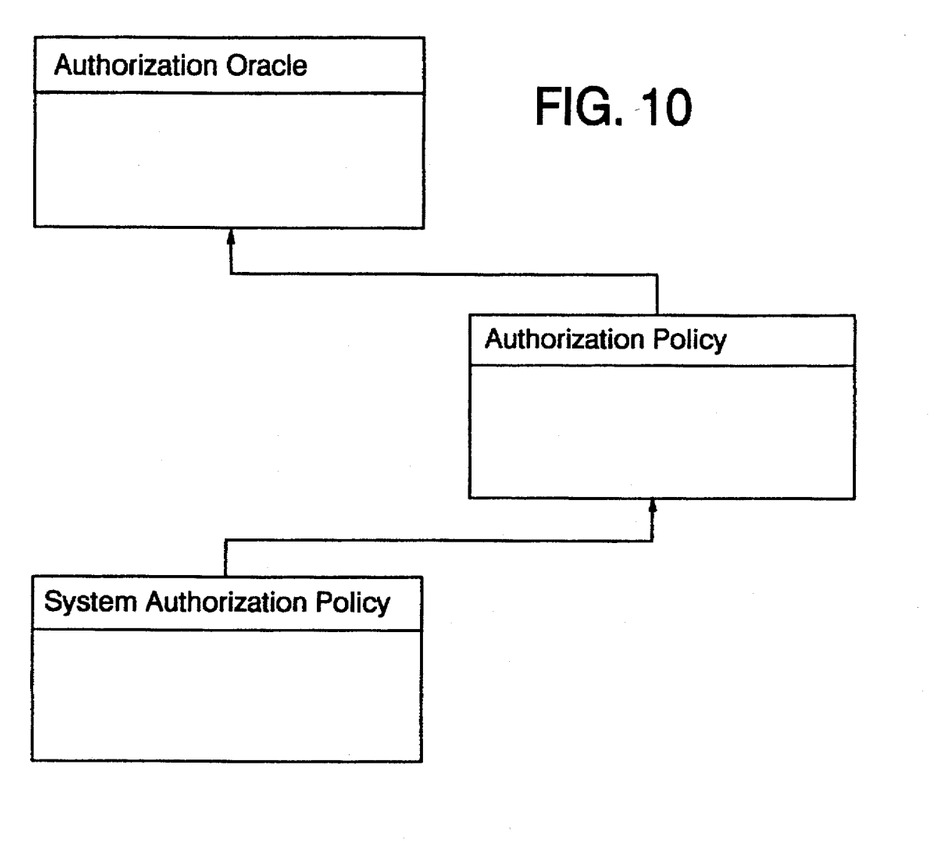
FIG. 10 is an object model diagram which illustrates the OSS authorization object inheritance hierarchy according to the present invention.

OSS defines a particular authorization policy object called the system authorization policy (SAP) which provides access-matrix based semantics and an access matrix management interface. FIG. 10 is an object model diagram which illustrates the OSS authorization object inheritance hierarchy. The SAP object is based on general access control abstraction known as an access matrix. Systems administrators may use its interface to implement and manage a wide range of existing authorization policies. OSS implementations with policy requirements which cannot be met by the access matrix abstraction may implement different authorization policy objects. Different OSS implementations may elect either to have one system authorization policy object per server process, one per host machine, or one per network domain.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A method for improving system authorization and registration in an information handling system employing object oriented technology, comprising the steps of:

first building a system authorization policy object which encapsulates management of a resource authorization policy to an object oriented control program;

second building a system authorization oracle object which encapsulates the process of the decision making at access checking time; and third building a system registration object which encapsulates management of a subject registry.

2. A method according to claim 1, wherein said first building step further comprises the step of:

retrieving security attributes of objects in order to perform access checking.

3. A method according to claim 1, wherein the second building step further comprises the step of:

isolating the system authorization oracle object from the system authorization policy object to make it independent from underlying policy registry implementation mechanisms and enforce system integrity.

4. A method according to claim 1, wherein the third building step further comprises the step of:

managing subject capability for environments that are capability based for authorization.

5. A computer readable medium comprising:

means for first building a system authorization policy object which encapsulates management of a resource authorization policy to an object oriented control program;

means for second building a system authorization oracle object which encapsulates the process of the decision making at access checking time; and means for third building a system registration object which encapsulates management of a subject registry.

6. A computer readable medium, according to claim 5, wherein said searching means further comprises:

means for retrieving security attributes of objects in order to perform access checking.

7. A computer readable medium, according to claim 5, further comprising:

means for isolating the system authorization oracle object from the system authorization policy object to make it independent from underlying policy registry implementation mechanisms and enforce system integrity.

8. A computer readable medium, according to claim 5, further comprising:

means for managing subject capability for environments that are capability based for authorization.

9. A system, for improving object security, in an information handling system employing object oriented technology, comprising:

one or more processors;

a storage system;

one or more I/O controllers for controlling I/O devices;

a system bus interconnecting the processors, the storage system, and the I/O controllers;

a system control program controlling operation of the system;

one or more application programs for executing user tasks; and an object oriented control program, the object oriented control program comprising
 a system authorization policy object which encapsulates management of a resource authorization policy to the object oriented control program;
 a system authorization oracle object which encapsulates a process of decision making at access checking time; and
 a system registration object which encapsulates management of a subject registry.

10. A system, according to claim 9, further comprising:

means for first building the system authorization policy object;

means for second building the system authorization oracle object; and means for third building the system registration object.

11. A system, according to claim 9, further comprising:

means for retrieving security attributes of objects in order to perform access checking.

12. A system, according to claim 9, further comprising:

means for isolating the system authorization oracle object from the system authorization policy object to make it independent from underlying policy registry implementation mechanisms and enforce system integrity.

13. A system, according to claim 9, further comprising:

means for managing subject capability for environments that are capability based for authorization.

14. A system, according to claim 9, further comprising:

a cursor control device connected to an I/O controller.

15. A system, according to claim 9, further comprising:

a display subsystem, connected to the system bus, for displaying visual representations of objects and other information.

16. A system, according to claim 9, further comprising:

a display subsystem, connected to an I/O controller, for displaying visual representations of objects and other information.

* * * * *